Aug. 10, 1943.   R. T. ENDERSON   2,326,447
PIPE CUTTING GAUGE
Filed Sept. 28, 1942
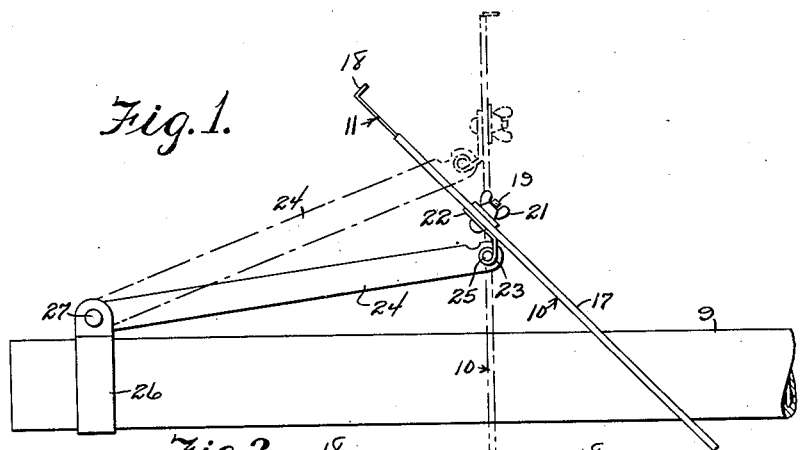
Fig. 1.
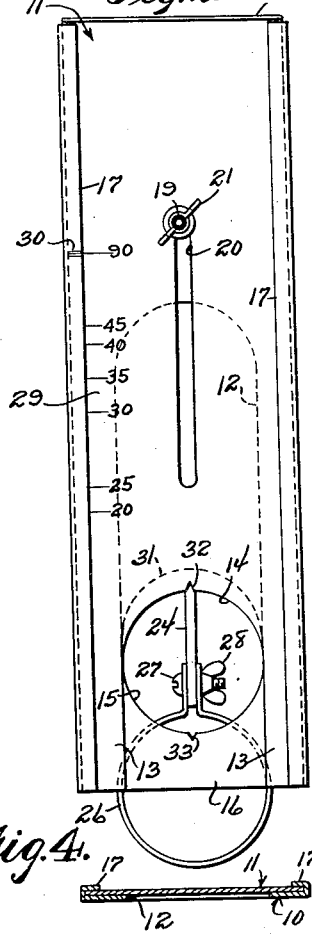
Fig. 2.
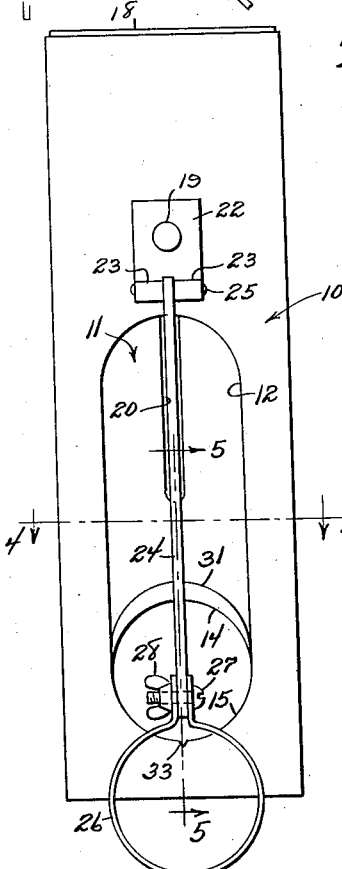
Fig. 3.
Fig. 5.
Fig. 4.
INVENTOR.
Reuben T. Enderson
BY
Victor J. Evans & Co.
ATTORNEYS Patented Aug. 10, 1943

2,326,447

UNITED STATES PATENT OFFICE 2,326,447

PIPE CUTTING GAUGE

Reuben T. Enderson, Rochester, Minn.

Application September 28, 1942, Serial No. 459,989

4 Claims. (Cl. 33—174)

This invention relates to a pipe cutting gauge and has for an object to provide a device for defining a line on a length of pipe, at a desired angle to the axis of the pipe, so that angular pipe joints may be made without the usual experiments.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a side elevation of a pipe cutting gauge, constructed in accordance with the invention, applied to a pipe for marking an angle along which the pipe is to be cut.

Figure 2 is a top plan view of the pipe cutting gauge removed from the pipe.

Figure 3 is a bottom plan view of the pipe cutting gauge shown in Figure 2.

Figure 4 is a cross sectional view taken on the line 4—4 of Figure 3.

Figure 5 is a longitudinal sectional view taken on the line 5—5 of Figure 3.

Referring now to the drawing in which like characters of reference designate similar parts in the various views, the pipe cutting gauge comprises elongated lower and upper plates 10 and 11 slidable longitudinally relatively to each other, the bottom plate being provided with an elongated elliptical opening 12 and the upper plate being provided with legs 13 and being rounded as shown at 14 between the legs, the legs, the rounded edge 14, cooperating with a rounded edge 15 on a plate 16 which is fixed to the bottom plate, to form an elliptical opening when the plates are moved endwise outwardly relatively to each other so that both plates may receive a pipe 9 and permit the plates being inclined relatively to the axis of the pipe at various angles to indicate a cutting line on the pipe, which may be inscribed by a pointed tool or other marking device.

The lower plate 10 is provided at the side edges with upwardly and inwardly bent flanges 17, see Figure 4, to provide guides in which the side edges of the upper plate 11 are located.

To facilitate the adjustment of one plate with relation to the other, the upper plate has one end edge bent at a right angle to the plate to provide a finger hold 18, see Figure 1.

The adjustment of the plates with relation to each other is limited, and the plates are secured in adjusted relation, by a bolt 19 through an opening in the lower plate and passing through a longitudinal slot 20 in the upper plate, there being a wing nut 21 on the bolt adapted to contact with the upper side of the upper plate.

A plate 22 is secured to the head of the bolt below the bottom of the lower plate and is provided with hinge ears 23. A link 24 is pivoted at one end between the hinge ears through the medium of a pivot pin 25 passed through the hinge ears and through an opening in the link. The opposite end of the link is provided with a split ring collar 26 the ends of which are secured to the link through the medium of the bolt 27 and a wing nut 28.

The upper plate is provided with graduations indicated at 29 and one of the guide flanges 17 is provided with a graduation indicated at 30, see Figure 2 with which the graduations on the upper plate are selectively brought into register when the plates are adjusted to effect the marking of the pipe to be cut.

In operation the collar 26 is disposed to surround the pipe and is tightly anchored to the pipe by tightening of the wing nut 28 so that the lower end of the link 24 will remain stationary. The pipe 17 is passed through the registering elongated elliptical openings in both the upper plate and the lower plate. To adjust the plates to act as a straight edge facilitating the marking of the pipe at a desired angle, the wing nut 21 is loosened and the particular angular graduation, say for example ninety degrees, is brought into register with the graduation 30 on the guide flange as shown in Figure 1 and while this is being done both plates have been swung to the vertical by the link 24, as indicated by dotted lines in Figure 1. A marking tool may now be run along the pipe using the upper plate as a straight edge to mark the ninety degree cut to be made. Lesser angular cuts may be indicated by loosening the wing nut 21 and bringing the desired graduation, say forty-five degrees into register with the graduation 20 and by so doing the upper plate is moved relatively to the lower plate and at the same time rocks on the link 24 to the forty-five degree position relatively to the axis of the pipe as indicated by full lines in Figure 1.

The upper plate 11 is provided on its lower face with a stop shoulder 31, see Figures 3 and 5, which will engage the curved upper end of the substantially elliptical opening 12 in the lower plate to limit outward relative movement of both plates. Also the upper plate 11 and the plate 16 between the legs 13 of the upper plate, are provided with indicating notches 32 and 33 to denote the center of the pipe.

From the above description it is thought that the construction and operation of the invention will be fully understood without further explanation.

What is claimed is:

1. A pipe cutting gauge comprising elongated upper and lower plates slideably connected together and provided at one side of the transverse center with substantially elliptical openings, guide flanges on one of the plates engaging the side flanges of the other plate, one of the plates being bent downwardly to provide a finger hold, a bolt carried by the lower plate engaged in a slot formed in and extending longitudinally of the upper plate, a nut on the bolt contacting with the upper plate, said bolt and nut securing the plates in adjusted relation, hinge lugs secured to and extending downwardly from the lower plate at said bolt, a link pivoted at one end to said lugs, and a collar adapted to surround a pipe passing through the elliptical openings in the plate pivoted to the other end of the link, the upper plate and one of the guide flanges being suitably graduated.

2. The structure as of claim 1 and in which the collar is a split ring secured to the link through the medium of a bolt and wing nut.

3. The structure as of claim 1 and in which outward movement of the plates relatively to each other is limited through the medium of a stop shoulder on the lower plate adapted to engage an end wall of the elliptical opening of the upper plate.

4. The structure as of claim 1 and in which the elliptical opening of the upper plate is defined by spaced legs formed on the upper plate, the upper plate being rounded between the legs, and a plate fixed to the lower plate between the free ends of the legs having a rounded edge.

REUBEN T. ENDERSON.